US007028803B2

(12) United States Patent
Abele et al.

(10) Patent No.: US 7,028,803 B2
(45) Date of Patent: Apr. 18, 2006

(54) ELECTROMECHANICAL STEERING SYSTEM FOR A VEHICLE

(75) Inventors: Wolfgang Abele, Spraitbach (DE); Gerhard Ruf, Huettlingen (DE); Stefan Froehlich, Zimmerbach (DE)

(73) Assignee: ZF Lenksysteme GmbH, Schwaebisch Gmuend (DE)

( * ) Notice: Subject to any disclaimer, the term of this patent is extended or adjusted under 35 U.S.C. 154(b) by 0 days.

(21) Appl. No.: 10/477,312

(22) PCT Filed: Jun. 4, 2002

(86) PCT No.: PCT/EP02/06093

§ 371 (c)(1),
(2), (4) Date: May 5, 2004

(87) PCT Pub. No.: WO02/100705

PCT Pub. Date: Dec. 19, 2002

(65) Prior Publication Data

US 2004/0207278 A1    Oct. 21, 2004

(30) Foreign Application Priority Data

Jun. 7, 2001    (DE)    ................................ 101 27 816

(51) Int. Cl.
    *B62D 7/15*    (2006.01)

(52) U.S. Cl. ...................................... 180/444; 180/443
(58) Field of Classification Search ......... 180/443–446
    See application file for complete search history.

(56) References Cited

U.S. PATENT DOCUMENTS 6,422,336 B1 *   7/2002   Abele et al. ................. 180/446
6,491,131 B1 *  12/2002   Appleyard ................... 180/444
6,725,964 B1 *   4/2004   Appleyard ................... 180/444

FOREIGN PATENT DOCUMENTS

| DE | 197 55 094 | 6/1999  |
| DE | 198 28 513 | 12/1999 |
| DE | 198 49 326 | 4/2000  |

* cited by examiner

*Primary Examiner*—Lesley D. Morris
*Assistant Examiner*—Matthew Luby
(74) *Attorney, Agent, or Firm*—Jordan and Hamburg LLP

(57) ABSTRACT

An electromechanical steering system for a vehicle comprises a steering shaft, which is mounted rotatably in an accommodating space of a steering housing, and an electric motor, which, acts upon steering shaft over a transmission. Furthermore, a coil spring housing with a coil spring is provided in the accommodating space. The accommodating space is divided by a partition into a section accommodating the coil spring and a section accommodating the transmission. A damping almond is integrated in the partition. The housing of the coil spring forms part of the partition.

10 Claims, 1 Drawing Sheet

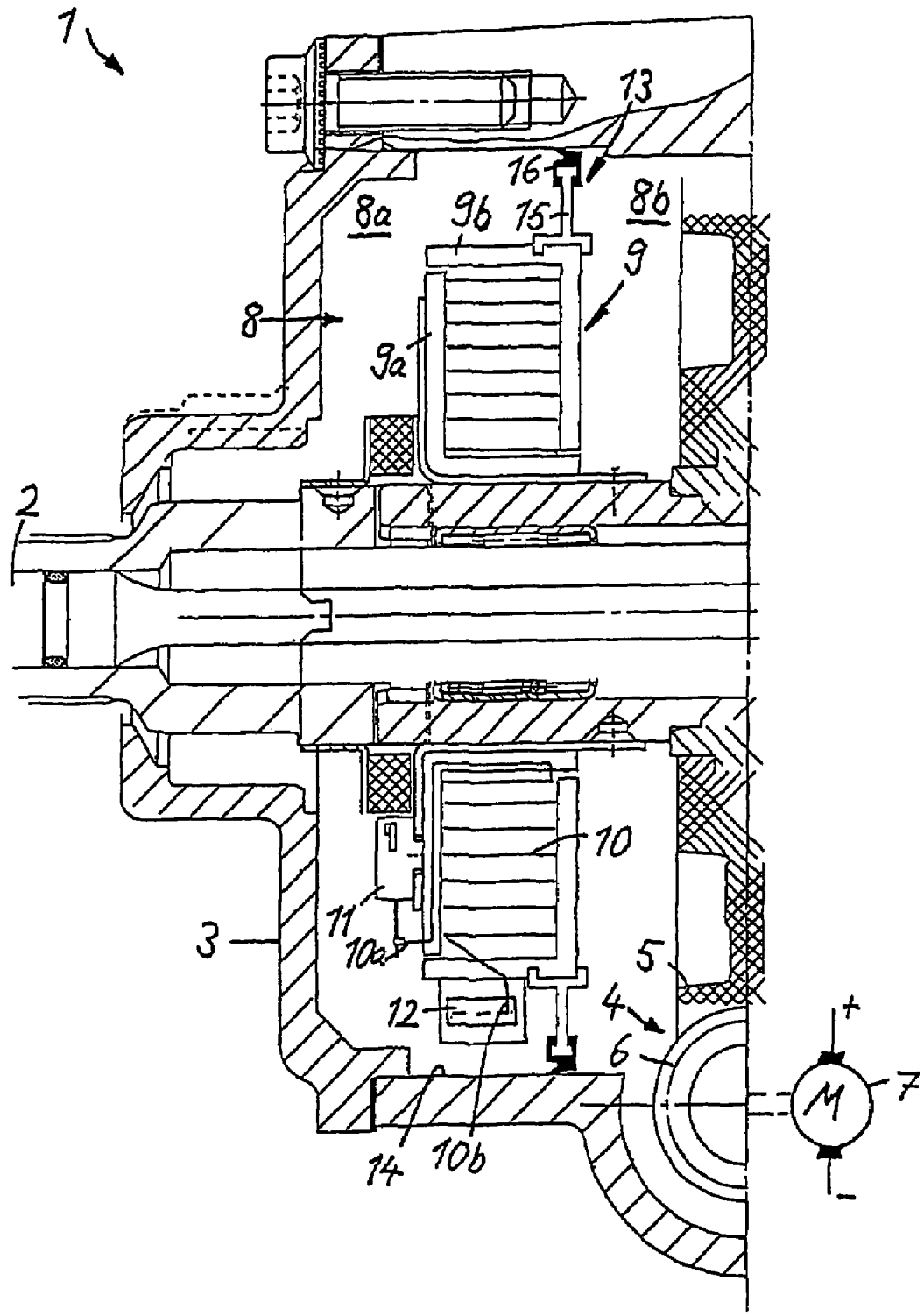

ELECTROMECHANICAL STEERING SYSTEM FOR A VEHICLE

BACKGROUND OF THE INVENTION

The invention relates to an electromechanical steering system for a vehicle.

DE-A1-1972853 discloses such an electromechanical steering system. For supporting the steering moment produced by the driver, the steering system has an additional system, which is driven by an electric motor and acts on the steering shaft of the steering system and meshes with the steering shaft over a worm gear, as a result of which an additional moment, supporting the steering motion of the driver, can be introduced into the steering shaft. In order to obtain information about the steering angle and the steering angle speed, a steering angle sensor, the signals of which are transferred by a coil spring to a control device in the housing, is provided on the steering shaft. The coil spring is located in a coil spring housing and is connected at one end with the sensor, rotating with the steering shaft, and, at the other, with a socket attached to the housing, over which an electrical contact to the steering device can be produced. The coil spring is in a position to carry out, without damage, the steering shaft rotations occurring during the driving operation.

The coil spring housing with the coil spring disposed therein described in DE-A1-19228513 is located in an accommodating space within a steering housing, in which the steering shaft is mounted rotatably. The worm gear, which transfers the rotational movement of the electric motor to the steering shaft for supporting the steering movement, is located in the accommodating space in the steering housing. So as to prevent contamination of the sensor or of the contact sites of the sensor or of a magnet assigned to the sensor by the lubricating grease of the worm gear, a partition is provided there, which divides the accommodating space into a section, which accommodates the coil spring, and a section, which accommodates the transmission. The housing of the coil spring forms a part of this partition.

The DE-A1 197 55 094 also discloses such an electromechanical steering system.

The coil spring housing with the coil spring disposed therein is located in an accommodating space within a steering housing, in which the steering shaft is mounted rotatably. The worm gear, which transfers the rotational movement of the electric motor to the steering shaft for supporting the steering movement, is located in the accommodating space in the steering housing. It is necessary to pay attention so that the sensor or the contact sites of the sensor or a magnet, assigned to the sensor, are not contaminated by the lubricating grease of the worm gear. In addition, the coil springs, including the coil spring housing and the steering angle sensor, also represent a source of danger for the worm gear, since the latter can be blocked in the event that a component within the accommodating space becomes detached or breaks off.

SUMMARY OF THE INVENTION

It is an object of the invention to construct a generic, operationally safe steering system for a vehicle with simple means.

The electromechanical steering system has an accommodating space, which is divided by a partition into two separate sections, a damping element being integrated in the partition for damping vibrations of the coil spring housing and the coil spring housing, especially the bottom of the coil spring housing, forming part of the partition. This construction is distinguished by a series of advantages:

Because of the division into two separate sections, in which in each case the transmission of the electric motor and the coil spring are accommodated, on the one hand, the danger is prevented that the lubricating grease of the transmission comes into contact with the sensor or the contact sites of the sensor or a magnet assigned to the sensor, which could be damaged thereby, and, on the other, that a part of the coil spring, which has accidentally become detached, or of the coil spring housing or of a component disposed thereon gets into the denticulation of the transmission, which could become blocked thereby and therefore also result in the blockage of the steering. The partition can be inserted in the accommodating space in the steering housing during the installation of the steering system: on the other hand, it is not necessary to provide a partition in the accommodating space from the very start.

Since the bottom of the coil spring housing forms part of the partition, a particularly compact construction is achieved with this advantageous embodiment, because the bottom of the coil spring housing lies in a common plane of separation with the further sections of the partition.

The damping element, integrated in the partition, decreases vibrations of the coil spring housing, especially radial vibrations, which act in the radial direction transversely to the steering axis of the steering system. The damping of the vibrations results in a reduction of the noise level and, in addition, improves the service life of the coil spring housing including that of the coil spring disposed therein, since the mechanical stresses are reduced.

In an appropriate further development, the damping element is ring-shaped and disposed in the section of the partition between the radial outside of the coil spring housing and the inside of the embracing radial outer wall of the accommodating space. In a particularly simple embodiment, the damping element is a gasket or comprises a gasket, the rubber of which has vibration-damping properties. This embodiment furthermore offers the advantage that the partition can be installed easily in the accommodating space of the steering housing.

The damping element, especially the seal constructed as a gasket, can be bonded on a gasket support or sprayed on the latter. The gasket support here is either identical with the coil housing or is a support ring, which is constructed separately but connected with the coil housing.

The damping element, especially the gasket, can also compensate for different thermal expansions of the coil housing and of the inner wall of the accommodating space.

Further advantages and appropriate embodiments may be inferred from the claims, the description of the FIGURE and the drawing.

BRIEF DESCRIPTION OF THE DRAWINGS

The FIGURE shows a steering housing in section of an electromechanical steering system for a vehicle.

DESCRIPTION OF THE PREFERRED EMBODIMENTS

The steering system 1 for a vehicle is constructed as an electromechanical system and comprises a steering shaft 2, which is disposed in a steering housing 3 and over which the steering actuation of the driver is transferred to the steered wheels. To support the steering actuation, a supportive torque of an electric motor 7 is introduced over a rotor 6 over a transmission 4, which comprises a worm wheel 5 revolving with the steering shaft 2. The electric motor 7 can be adjusted by a control device as a function of the state variables and the operating variables of the vehicle, especially of the steering system. The rotor 6 of the electric motor 7 or a component 6, driven by the rotor of the electric motor represents, in relation to the worm wheel, a driving wheel, the rotation of which is transferred to the worm wheel 5, which is disposed coaxially within the steering shaft 2 and further to the steering shaft, which is disposed coaxially with the steering shaft 2, and further to the steering shaft 2.

In the steering housing 3, an accommodating space 8 is provided, in which the steering shaft 2 is mounted rotatably. The transmission 4 between the electric motor 7 and the steering shaft 2 is also disposed in the accommodating space 8, as is optionally also the electric motor 7.

Furthermore, a coil spring housing 9 is provided in the accommodating space 8. It is constructed ring-shaped, seated on the steering shaft 2 and disposed coaxially with the latter. The coil spring housing 9 has a first housing section 9a, which is adjacent with the steering shaft 2, with which it rotates, as well as a second housing section 9b, which is connected with the steering housing 3, so that the housing sections 9a and 9b can be rotated relative to one another in correspondence with the steering motion of the steering shaft 2.

In the annular space of the coil spring housing 9, a coil spring 10 is wound spirally. One end 10a of the coil spring 10 is connected firmly with the section 9a of the coil spring housing rotating with the steering shaft 2 and communicates with a torque sensor 11, which is also disposed in the accommodating space 8 and rotates with the steering shaft 2. The second end 10b of the coil spring is connected firmly with the housing section 9b of the coil spring housing, which is connected firmly with the steering housing 3. The second coil spring end 10b is connected, in particular, with a socket 12, which advisably is seated on the radial outer side of the coil spring housing 9 on the housing section 9b and is constructed to accommodate the plug, over which the signals, which are transmitted over the coil spring 10 and contain steering angle information from the torque sensor 11, are supplied to a regulating and control unit for further evaluation.

The accommodating space 8 in the steering housing 3 is divided into two with two sections 8a and 8b, which are divided by a partition 13. The partition 13 extends between the steering shaft 2 and the outer wall 14 of the steering housing 3, which radially embraces accommodating space 8, the two sections 8a and 8b of the accommodating space, separated by the partition 13, being divided appropriately in such a manner, that transfer of dirt and of loose parts between the two sections of the accommodating space is prevented.

The partition 13 is formed by a radial wall side of the housing section 9b of the coil spring housing 9, which is firmly connected with the steering housing 3, a radially extending support ring 15 slipped onto the housing section 9b and an annular gasket 16, which is bonded onto the support ring 15 and fills the gap remaining between the support ring and the inside of the outer wall 14 of the steering housing. The radial part of the housing section 9b, the support ring 15 and the gasket 16 lie in a common partitioning plane here. The gasket 16 lies against the inside of the outer wall 14 of the steering housing 3, as a result of which a complete separation between the two sections 8a and 8b of the accommodating space 8 is achieved. Because of the pliability and damping properties of the gasket 16, damping of radial vibrations and impacts, emanating from the steering shaft 2 and spreading out over the coil spring housing 9, is achieved. The vibration-damping properties of the gasket 16 can be improved by an appropriate structural configuration of the gasket, for example, by a sealing lip, which protrudes from the body of the gasket 16 and lies against the inside of the outer wall 14.

In the first section 8a of the accommodating space 8, there is the torque sensor 11 as well as the greater part of the coil spring housing 9, including the coil spring 10, which is wound up therein. The part of the partition 13, assigned to the coil spring housing 9, is formed by the bottom of the coil spring housing. In the second section 8b of the accommodating housing 8, the transmission with the worm wheel 5 and the rotor 6 or a component 6, acted upon by the rotor, and optionally also the electric motor 7 are disposed.

Centering of the coil spring housing 9 in the accommodating space 8 is achieved by the partition 13, by means of which the friction between the revolving components and the components attached to the housing, as well as the development of noise are reduced.

LIST OF REFERENCE SYMBOLS 1 steering system
2 steering shaft
3 steering housing
4 transmission
5 worm wheel
6 rotor
7 electric motor
8 accommodating space
8a section
8b section
9 coil spring housing
9a housing section
9b housing section
10 coil spring
10a end
10b end
11 torque sensor
12 socket seat
13 partition
14 outer wall
15 support ring
16 gasket

The invention claimed is:

1. Electromechanical steering system for a vehicle, with a steering shaft, rotatably mounted in an accommodating space of a steering housing, and an electric motor acting upon the steering shaft over a transmission, a coil spring housing with a coil spring being disposed in the accommodating space, the accommodating space being divided by a partition into one section accommodating the coil spring, and another section accommodating a transmission, the coil spring housing forming part of the partition, and a damping element comprising a seal with a sealing lip, said sealing lip being disposed at a distance from a sealing element of the seal, said damping element being disposed against the inside o the outer wall of the steering housing and being integrated in the partition.

2. The steering system of claim 1, wherein the damping element is ring-shaped and disposed between the radial outside of the coil spring housing and the embracing radial outer wall of the accommodating space in the steering housing.

3. The steering system of claims 1 or 2, wherein the damping element is slipped onto the coil spring housing.

4. The steering system of claim 1, characterized in that the wherein the seal is accommodated in a seal support.

5. The steering system of claim 4, wherein the seal is sprayed onto the seal support.

6. The steering system of claim 4, wherein the seal is bonded onto the seal support.

7. The steering system of one of the claims 4 to 6, wherein the seal support is the coil housing.

8. The steering system of one of the claims 4 to 6, wherein the seal support is a support ring constructed separately from the coil housing and connected with the coil housing.

9. The steering system of claim 1 or 2, wherein a sensor connected to rotate with the steering shaft is provided to determine the steering angle in the section of the accommodating space accommodating the coil spring.

10. The steering system of claim 1 or 2, wherein the transmission between the electric motor and the steering shaft is a worm gear.

* * * * *